US006266220B1

(12) United States Patent
Lahoud

(10) Patent No.: US 6,266,220 B1
(45) Date of Patent: *Jul. 24, 2001

(54) INTERNAL SURGE PROTECTOR DEVICE

(76) Inventor: Sami S. Lahoud, 7610 Del Rey La., Houston, TX (US) 77071-1416

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,141

(22) Filed: Jun. 9, 1997

(51) Int. Cl.[7] .................................................. H02H 9/00
(52) U.S. Cl. ............................................. 361/58; 361/104
(58) Field of Search ................................ 361/18, 56, 58, 361/111, 119, 103, 104, 90

(56) References Cited

U.S. PATENT DOCUMENTS

| 3,813,578 | * | 5/1974 | Tiffany | 361/58 |
| 4,726,638 | * | 2/1988 | Farrar et al. | 439/620 R |
| 4,878,145 | * | 10/1989 | Lace | 361/118 |
| 5,404,542 | * | 4/1995 | Cheung | 395/750 |
| 5,488,534 | * | 1/1996 | Rau et al. | 361/56 |
| 5,768,600 | * | 6/1998 | Williams | 395/750.1 |
| 6,014,750 | * | 1/2000 | Williams | 713/300 |

OTHER PUBLICATIONS

Electronic Buyers' News ; Jan. 19, 1998 n 1092 p. 60 (4).
Electronic Buyers' News ; May 4, 1997 n 1056 p. 3 (2).
Computer Shopper ; Aug. 1997 , v 17 n8 p. 91(2).

* cited by examiner

Primary Examiner—Ronald W. Leja
(74) Attorney, Agent, or Firm—Karen B. Tripp

(57) ABSTRACT

An internal power protection device which prevents the flow of power to an electronic component in response to an over-voltage or under-voltage signal condition. When the power supplied to the component is within a normal safe operating range for components of that type, the device allows power to flow through it to the power input terminal of the component. When the power supplied to the component is outside the normal safe operating range for components of that type, the device prevents power from flowing to the power input terminal of the component.

27 Claims, 3 Drawing Sheets

INTERNAL SURGE PROTECTOR DEVICE

TECHNICAL FIELD OF THE INVENTION

The present invention relates to novel, improved methods and systems for managing the flow of electricity to computer and other electronic hardware components and in particular to a method and apparatus to protect the components from voltage and power surges which can damage the equipment when the levels supplied to the electronic components surpass normal safe operating ranges.

BACKGROUND

Devices powered by an electric power supply generally have a voltage or power range across which they normally may operate safely. These devices may include computers and computer systems, computer components, power supplies, logic boards, hard disk drives and processors. Voltage or power fluctuations in the line connecting the power supply to the device being powered can push voltage or power beyond these normal operating ranges, and risks damaging the equipment.

For example, a computer motherboard is typically designed to be operated at voltages between +12 volts and −12 volts. The computer's power supply is powered from an alternating current (AC) wall outlet, and generates direct current (DC) power to run the computer system. The power supply transmitting the DC operating power may fluctuate, or surge, from time to time, causing the voltage at the power terminal of the component to rise above the +12 V DC limit, or sink below the −12 V DC limit. The safe operating range designed into the motherboard typically takes into account minor surges or dips in power. Therefore, the motherboard may typically operate without any danger to its components even if the operating voltage is pushed slightly beyond its normal operating range. When the operating voltage rises above the upper safe operating limit (an over-voltage condition), or sinks below the lower safe operating limit (an under-voltage condition), the motherboard or components thereof may be damaged or even destroyed by the excess power. Consequently, the end user of the motherboard may spend hundreds of dollars to replace damaged components or even an entire system. A need therefore exists for some method or device that will protect the sensitive internal components of a computer system or other electronic device from these dangerous power surges and dips.

Others have attempted to solve the problems attributable to DC power fluctuations with external surge protectors that plug in to AC wall outlets. The power cord which supplies the AC power to the electronic system is plugged into an external surge protector device, often in the form of a multiple device strip, which protects against AC fluctuations that physically occur outside of the electronic device or system between the wall AC outlet and the system's internal power supply. The general purpose of this approach is to manage the fluctuations at a location closer to the point of origin. The objective of placing the surge protector at this location is to send only safe AC power to the internal power supply, which in turn, should produce only safe DC power. There are several drawbacks to this approach. Most notably, these external surge protectors do not address the problems that arise from power fluctuations occurring inside the system from the power supply unit itself. Although the system is protected from dangerous external AC power fluctuations, there is nothing between the power supply component and the other sensitive electronic components to protect them from fluctuations caused by the power supply.

The invention disclosed herein provides protection for electronic components from these types of power fluctuations by managing the flow of power from the internal power source to the internal components of a particular electronic device or system.

Others have attempted to solve the problems attributable to internal power fluctuations with devices that constantly monitor the voltage or power output from a power supply, and then shut down the power supply output when an over-voltage or under-voltage situation is detected. See U.S. Pat. No. 4,951,171 issued on Aug. 21, 1990 to Tran, et al. There are several drawbacks to this approach. First, the Tran invention requires the use of an active circuit to compare the power output level with a reference voltage level, and then determine whether the supply should be shut down. The protection circuit itself must also be powered from some dependent or independent source, because it includes active electronic components. Further, the invention requires numerous, costly components to make up the circuit which is used to monitor the power supply, and to generate the variety of different signals that enable or disable the power supply according to the result of the comparison. Due to the large number of components needed to create the circuit, and their relative complexity, the invention disclosed in Tran is not cost-efficient, and results in an increased cost of manufacture for which the end user ultimately pays. Further, there is no "add-on" circuit which can be installed in units that do not come with the protection circuit factory installed.

Therefore a need exists to provide effective, cost-efficient protection of electronic components from power fluctuations that may occur in an on-board or dedicated power supply.

SUMMARY OF THE INVENTION

There have now been invented and disclosed herein certain new and novel electronic system protection devices which have the advantage over those heretofore proposed in that they provide complete protection against over-voltage and under-voltage signal conditions without the need for sophisticated monitoring circuitry. Further, the invention as disclosed herein consists of relatively few components that are passive in nature, therefore requiring no outside power source. Further, due to the small number of components and their simplicity, the device provides protection from power fluctuations in both a cost-efficient and space-efficient manner.

The design, as disclosed herein, allows for convenient mounting within the system. As disclosed, the device may be mounted directly to the power supply, directly to a specific component, or anywhere there-between. The invention provides for easy installation on currently existing systems, because it may be sold as a "kit." The kit may contain all necessary plugs, attachments, adaptors and/or other equipment necessary for installation. Additionally, the user will be provided an instruction booklet detailing the steps and methods for installing the invention into an existing system. Manufacturers may receive similar kits containing similar equipment and instructions for installation into future units.

The invention may protect one or more components operating at the same normal safe operating range at the same time, or protect each component individually. Finally, the invention, as disclosed herein, may individually protect several components operating at different normal safe operating ranges.

In summary, an internal surge protector of the kind herein disclosed provides better and broader protection from both over-voltage and under-voltage signal conditions, in a more cost-efficient and space-efficient way because it consists purely of passive components; and because its design allows for easy installation both during manufacture, and as an add-on.

BRIEF DESCRIPTION OF THE DRAWINGS

These and other objects and advantages of this invention and a better understanding of the principles and details of the invention will be evident from the following description taken in conjunction with the appended drawings in which.

DETAILED DESCRIPTION OF THE INVENTION

Figure 1A:
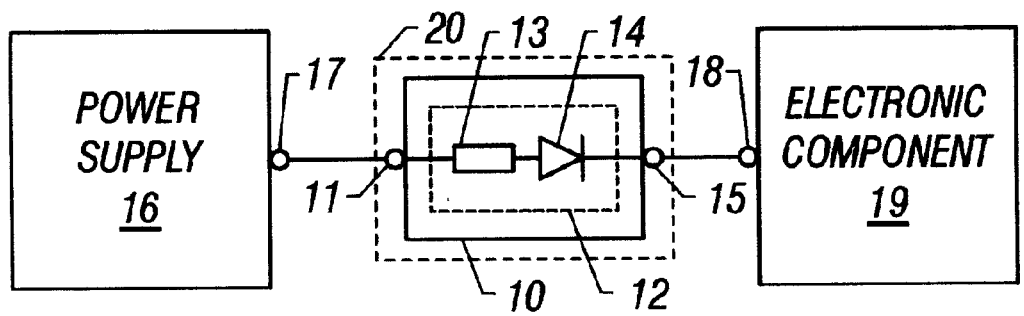
FIG. 1A shows a block diagram of a generic electronic system utilizing one embodiment of the invention.
Figure 1B:
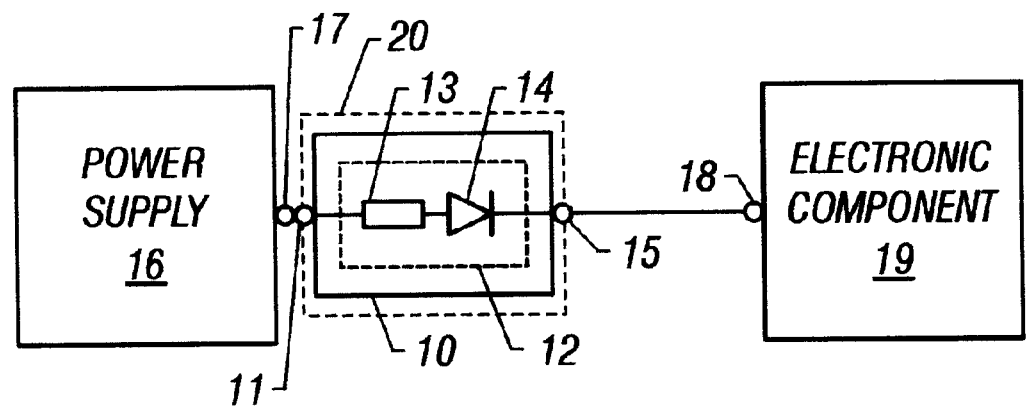
FIG. 1B shows a block diagram of the invention from FIG. 1A in a different location within the same system.
Figure 1C:
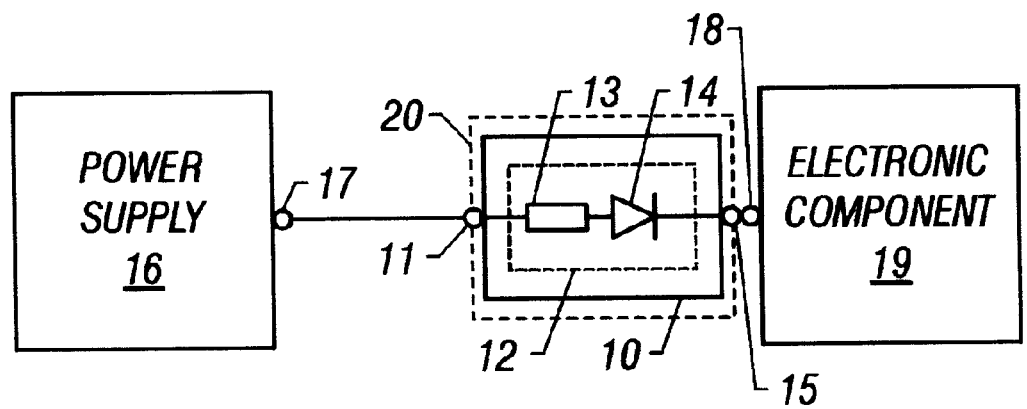
FIG. 1C shows a block diagram of the invention from FIG. 1A in a third different location within the same system.

Referring now to the drawings, and in particular, with reference to FIGS. 1A, 1B, and 1C, there is shown schematically one embodiment of an internal power protection device that illustrates the operation of this invention. An enclosure 10 houses the components of the invention. The power output from a power supply 16, flows from the output terminal 17 of the power supply 16 and into the input terminal 11 of the power protection device which is indicated generally as dash-lined box 20. After entering the device 20, through the input terminal 11, the power flows into the circuit breaking means 12. In the present embodiment of the invention, the circuit breaking means consists of a fuse 13 in series with a diode 14. The fuse 13 may be made of any material known in the art, and is chosen according to its power handling capability such that it will physically break the power flow through the device when the power supplied by the power supply 16 rises above the positive voltage end, or sinks below the negative voltage end, of the safe operating range of the component it protects. Depending on the implementation, the circuit breaking means 12 might be implemented in a semiconductor device. The diode 14 is a generic diode chosen according to its bias characteristics such that it will prevent power flow when the power supplied by power supply 16 sinks below the negative voltage end, or rises above the positive voltage end of the safe operating range of the component it protects. If the power supplied by power supply 16 is within the normal safe operating range of the component, then the fuse 13 and the diode 14 allow the power to flow normally through the device to output terminal 15. It should be noted that the circuit breaking means is not limited to a series combination of a fuse 13 and diode 14. The fuse 13 may be used without a diode, and vice versa. Further, any other circuit breaking means known in the art which will prevent the flow of power to an electronic component in response to an over-voltage or under-voltage condition may be used, either alone or in combination with the disclosed or any other circuit breaking means. When the device 20 operates within the normal safe operating range of the component 19 it protects, the power flows from output terminal 15 into the input terminal 18 of the protected electronic component 19 and powers it for normal use.

The device, 20 may be placed inside the power supply housing, or at any point clearly between the power supply 16 and the component to be protected 19, or within the housing for the component to be protected 19. In the embodiment of the invention shown in FIG. 1A, the device 20 is not directly attached to either the power supply 16 or the protected component 19, but may be connected to both the power supply 16 and the protected component 19 via wiring, or some other connective and conductive means, at any point there-between, as shown in FIG. 1A. In an alternative embodiment, the input terminal 11 of device 20 may be attached directly to the output terminal 17 of the power supply 16, as shown in FIG. 1B. In another embodiment, the output terminal 14 of device 20 may be attached directly to the input terminal 18 of the protected component 19, as shown in FIG. 1C.

Figure 2A:
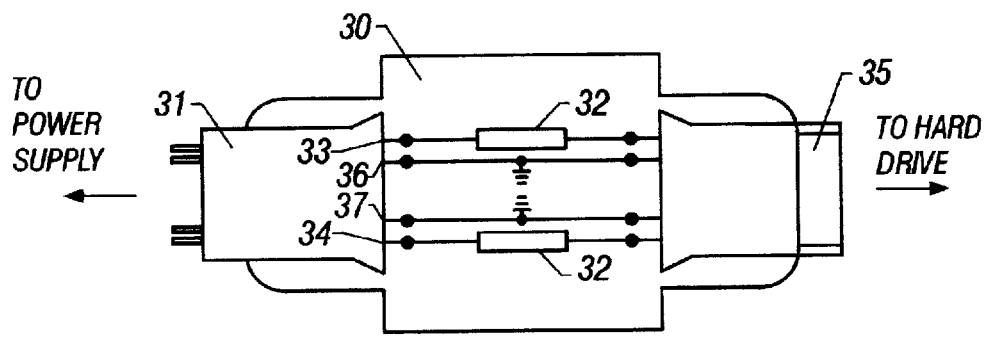
FIGS. 2A and 2B show a diagram of a preferred embodiment of the invention as used to protect a computer hard drive.

FIG. 2A shows a preferred embodiment of the invention for protecting a computer hard disk drive. Device 30 is connected between a computer power supply and a hard disk drive. Input terminal 31 connects to the output of a computer power supply line. Two circuit breaking means 32 permit the flow of power along voltage lines 33–34 to the output terminal 35 when the voltage level on the lines 33–34 is within the normal safe operating range of the hard drive. When the voltage level on lines 33–34 are outside the normal safe operating range of the hard drive, circuit breaking means 32 block power flow to the output terminal. Each of the circuit breaking means 32 protects a separate voltage input from the power supply. In other words, one of the circuit breaking means 32 protects against surges in the +5 V DC line 33, and one protects against surges in the –5 V DC line 34. Voltage lines 36–37 are grounded in accordance with a typical power supply line pin-out configuration. Output terminal 35 connects to the hard drive power line.

Figure 2B:
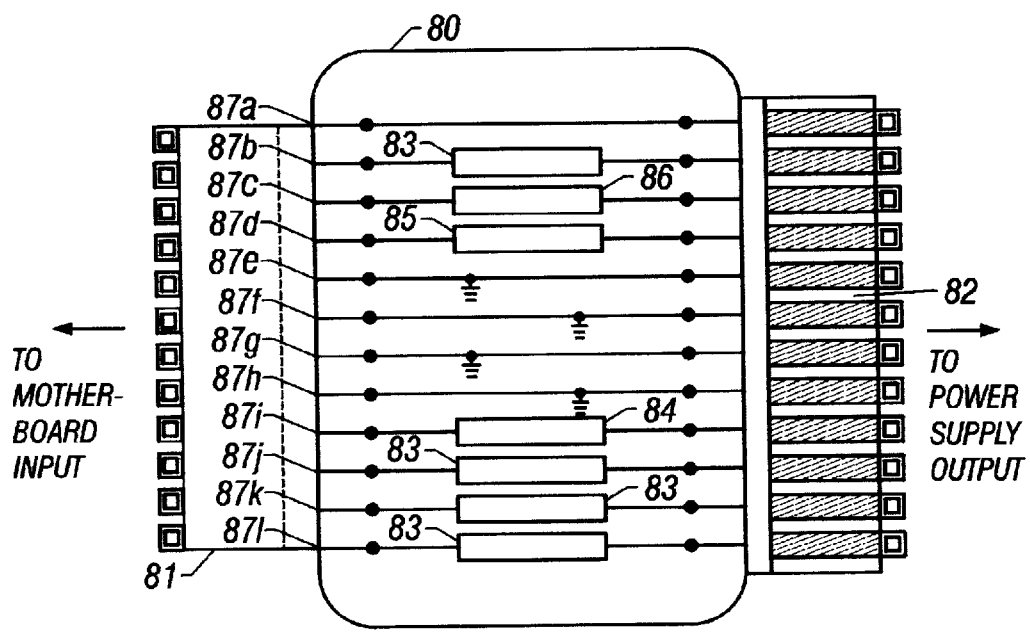

FIG. 2B depicts the preferred embodiment of the invention for protecting a computer motherboard. Device 80 is connected between a computer power supply's motherboard output and a computer motherboard. In the displayed embodiment, input terminal 82 connects directly to the output terminal of a computer power supply, however, it will be evident to those skilled in the art that the invention may be connected at any point between a power supply output and the input terminal of a computer motherboard. The input terminal 82 is configured to match the pin-out specifications of a computer power supply. The normal safe operating ranges for voltage lines 87a–87l are the typical voltage levels output by each specific output pin on a 12-pin power supply. For example, voltage lines 87b, 87j–l are +5 V DC lines, voltage line 87i is a –5 V DC, voltage line 87c is a +12 V DC line, and voltage line 87d is held at –12 V DC. Lines 87e–87h are held at the power supply's ground.

In addition to the 12 voltage lines 87a–87l, enclosure 80 also encloses seven circuit breaking means 83–86 which are individually configured to protect the motherboard from voltage fluctuations in voltage lines 87b–87d, 87i–87l. For each of circuit breaking means 83–86 the power flow to a motherboard will be enabled provided that the voltage on each of the individual voltage lines 87b–87d, 87i–87l remains within the individual normal safe operating voltage ranges of each voltage line 87b–87d, 87i–87l. If any of the individual voltage lines 87b–87d, 87i–87l rises or drops out of the normal safe operating range, the circuit breaking means 83–86 will prohibit the passage of power to the output terminal 81 and thus to the computer motherboard.

Figure 3A:
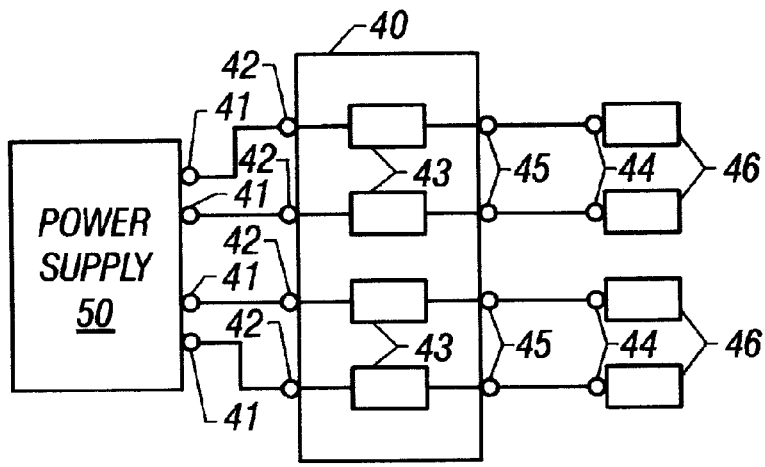
FIG. 3A shows a block diagram of a generic electronic system utilizing a second embodiment of the invention.
Figure 3B:
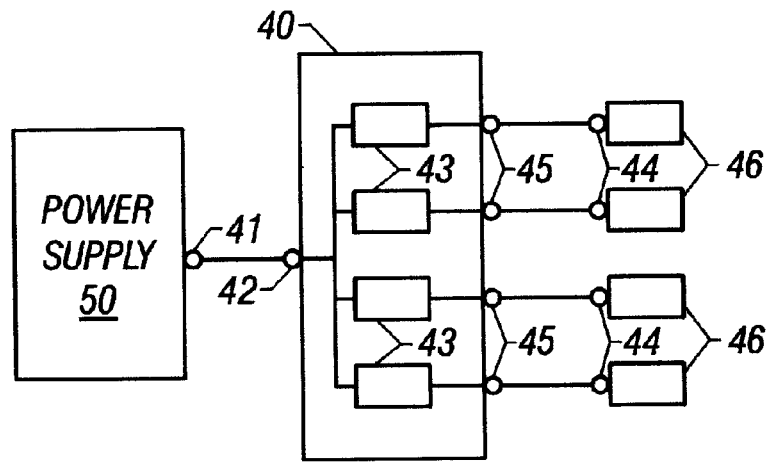
FIG. 3B shows a block diagram of the electronic system from FIG. 2A utilizing an alternative embodiment of the invention.

As shown in FIGS. 3A and 3B, the invention may comprise a plurality of surge protection devices bundled together in an internal "power strip" to simultaneously protect multiple components of an electronic system or device that operate either at the same or a plurality of different power levels. In FIG. 3A, the device 40 accepts a plurality of power outputs 41 from the power supply 50 at input terminals 42, and routes the power through a plurality of surge protector devices 43 which are connected in a one-to-one correspondence to the protected components 46.

Each of surge protector devices 43 corresponds to a particular individual power output 41, and individually facilitates or prevents the passage of the output power to one of the multiple electronic components 46. At each of surge protector devices 43, if the individual power output level is within the normal safe operating range of the individual component being protected, then the surge protector devices 43 will allow the passage of power through an output terminal 45, to the component 46. If the individual power output level is not within the normal safe operating range of the individual component being protected, then the surge protector devices 23 cuts off the flow of power to the component 46, preventing the excess power from damaging the component 46. The use of multiple surge protector devices 43 allows for greater flexibility and reliability because it ensures the protection of each individual component 46 without regard to the power level supplied to any other device. The invention as disclosed in FIG. 3A allows for broader and more flexible protection of multiple electronic components that operate at a plurality of different power levels.

As disclosed in FIG. 3B, the invention may include a plurality of circuit breakers bundled together in an internal "power strip" to simultaneously protect multiple components of an electronic system or device that operate at the same power level. In FIG. 3B, the device accepts only a single power output 41 from the power supply 50 at input terminal 42. Device 40 then splits the power line and routes it through a plurality of surge protector devices 43.

Each of surge protector devices 43 corresponds to and protects a particular individual electronic component 46. At each of surge protector devices 43, if the power output level is within the normal safe operating range of the individual component being protected, then the surge protector devices 43 will allow the passage of power through an output terminal 45, to the component 46. If the power output level is not within the normal safe operating range of the individual component being protected, then the surge protector device 43 cuts off the flow of power to the component 46, preventing the excess power from damaging the component 46.

In a typical application, if the power output level at output 41 is not within the normal safe operating range, then all of the surge protector devices 43 should prevent power flow to the individual component 46 they protect, since the power level flowing through each device should be the same. However, the actual power level flowing through any one of the surge protector devices 43 may be different from the others due to dissipation caused by any number of factors. The use of multiple surge protector devices 43 allows for greater flexibility and reliability because it ensures the protection of any individual component 46 without regard to the actual power level supplied to other devices operating within in the same normal operating range. The invention as disclosed in FIG. 3B allows for broader and more flexible protection of multiple electronic components that operate at the same power level.

Figure 4:
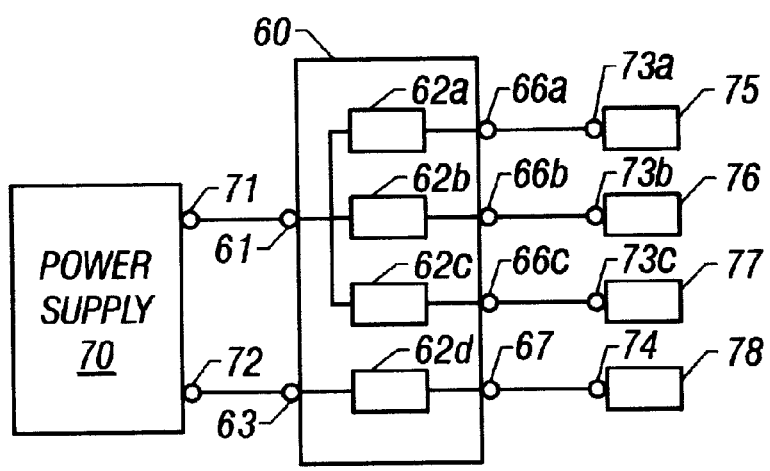
FIG. 4 shows a block diagram of a computer system utilizing one embodiment of the invention.

FIG. 4 shows a computer system utilizing one embodiment of the invention in a typical fashion to protect the components which make up the computer system. A power supply 70 powers the computer system. A typical computer power supply has two separate power output terminals, one power output terminal 72 is a twelve pin output used to power the computer's motherboard 78, while the other output terminal 71 is a 4-pin output which provides power to any other components and peripherals 75–77.

According to FIG. 4, the internal protection device 60 comprises multiple circuit breaking means 62a–62d, which individually protect a hard disk drive 75, a CD ROM drive 76, a floppy disk drive 77, and a motherboard 78. In the normal course of operation, the power flows through the output terminals 71 and 72 of the power supply 70, and into the internal protection device 60 at input terminals 61, 63. In the depicted embodiment, power from the output 71 flows into input terminal 61 while power from the output 72 flows into input terminal 63.

Inside the device 60 the input terminal 61 splits and route the power through three separate circuit breaking means 62a, 62b and 62c. Each of the circuit breaking means 62a, 62b, and 62c individually protects the hard drive 75, CD ROM drive 76 and floppy drive 77, respectively. If the actual power level received at input terminal 61, and flowing to any of the circuit breaking means 62a, 62b and 62c is outside of the normal safe operating range for any of the individual components, then that individual circuit breaking means 62a, 62b and/or 62c will prevent the flow of power to the particular component it protects 75, 76 and/or 77, independently of the power level flowing to any other circuit breaking means 62a–62c. If the actual power level flowing to any of the circuit breaking means 62a, 62b and 62c is within the normal safe operating range for components operating at ±5 V, then that individual circuit breaking means 62a–62c will facilitate the flow of power to the particular component 75–77 it protects, independently of the actual power level flowing to any other circuit breaking means 62a–62c.

Power from output 72, which drives the motherboard 78, flows into input terminal 63 of internal protection device 60. From input terminal 63 the power is routed to circuit breaking means 62d which is selected to provide protection for a computer motherboard 78. If the actual power level flowing to the circuit breaking means 62d is outside of the normal safe operating range for the motherboard 78, then the circuit breaking means 62d will prevent the flow of power to the motherboard 78, independently of the power level flowing to other circuit breaking means 62a–62c. If the actual power level flowing to the circuit breaking means 62d is within the normal safe operating range for the computer motherboard 78, then the circuit breaking means 62d will facilitate the flow of power through output terminal 67 to the motherboard 78, independently of the power level flowing to any other circuit breaking means 62a–62c.

The invention as disclosed above allows a flexible means to provide broad over-voltage and under-voltage protection to all of the sensitive components in an electronic device or system. As described above, the internal power protection circuit according to the present invention provides an efficient means for managing the flow of electricity to computer and other electronic hardware components in order to protect the components from voltage and power surges which can damage the equipment when the levels supplied to the electronic components surpass normal safe operating ranges. By allowing for independent protection of separate components, the invention allows for partial continued operation of electronic devices and systems following a power surge because the device only shuts down components that are endangered when the power surge pushes the supplied power outside the normal safe operating range of a particular component.

In addition, the invention accomplishes this purpose without the need for sophisticated, active monitoring circuitry which continuously monitors the power output to determine if the power is within the safe operating range. The passive elements in the invention instantly and effectively prevent over-voltage or under-voltage signal conditions from damaging expensive electronic hardware.

Additional advantages and modifications will be readily evident to those skilled in the art. Therefore, the invention in its broader aspects is not limited to the specific details and representative devices shown and described. Accordingly, various modifications may be made without departing from the spirit or scope of the general inventive concept as defined by the appended claims and their equivalents.

What is claimed is:

1. A device for managing the flow of power from an internal power supply of an electronic apparatus to one more electronic components inside said electronic apparatus, wherein at least one of said electronic components is a computer hard disk drive, said internal power supply having one or more output terminal and said one or more electronic components having each an input terminal, the device comprising:
   one or more circuit breking means corresponding to the number of said one more electronic components;
   said one or more circuit breaking means having each an inpuetd terminal and an output terminal;
   each of the input terminals of said one or more circuit breaking means connected to any of said one or more output terminals of said internal power supply of said electronic apparatus; and
   each of the output terminals of said one more circuit breaking means connected to a different input terminal of said one more electronic components.

2. A device for managing the flow of power from an internal power supply of an electronic apparatus to one or more electronic components inside said electronic apparatus, said internal power supply having one or more output terminal and said one or more electornic components having each an input terminal, wherein at least one of said electronic components is a CD ROM drive, the device comprising:
   one or more circuit breaking means corresponding to the number of said one or more electronic components;
   said one or more circuit breaking means having each an input terminal and output terminal;
   each of the input terminals of said one or more circuit breaking means connected to any of said one or more output terminals of said internal power supply of said electronic apparatus; and
   each of the output terminals of said one or more circuit breaking means connected to a different input terminal of said one more electronic components.

3. A device for managing the flow of power from an internal power supply of an electronic apparatus to one or more electronic components inside said electronic apparatus, said internal power supply having one or more output terminal and said one or more electornic components having each an input terminal, wherein at least one of said electronic components is a floppy disk drive, the device comprising:
   one or more circuit breaking means corresponding to the number of said one or more electronic components;
   said one or more circuit breaking means having each an input terminal and output terminal;
   each of the output terminals of said one or more circuit breaking means connected to any of said one or more output terminals of said internal power supply of said electronic apparatus; and
   each of the output terminals of said one or more circuit breaking means connected to a different input terminal of said one or more electronic components.

4. A device for managing the flow of power from an internal power supply of an electronic apparatus to one or more electronic components inside said electronic apparatus, said internal power supply having one or more output terminals and said one or more electronic components having each an input terminal, wherein at least one of said electronic components is a motherboard, the device comprising:
   one or more circuit breaking means corresponding to the number of said one or more electronics components;
   said one or more circuit breaking means having each an input terminal and an a output terminal;
   each of the input terminals of said one or more circuit breaking means connected to any of said one or more output terminals of said internal power supply of said electronic apparatus; and
   each of the output terminals of said one or more circuit breaking means connected to a different input terminal of said one or more electronic components.

5. A device for preventing the flow of power from an internal power supply to a computer motherboard, wherein said device, said internal power supply and said computer motherboard are inside a computer housing which also houses a computer, wherein said internal power supply has at least one output terminal and said computer motherboard has at least one input terminal, and wherein said device is attached in said housing at a point between the output terminal or terminal of said power supply and the input terminal or terminal of said computer motherboard, said device comprising:
   one or more circuit breaking means corresponding to the number of said input terminal of said computer motherboard; wherein
   each said circuit breaking means has an input terminal and an output terminal;
   each input terminal of said circuit breaking means is connected to an output terminal of said internal power supply; and
   each output terminal of said circuit breaking means is connect to an input terminal of said computer motherboard.

6. The device according to claim 5 wherein said circuit breaking means prevents the flow of power to the computer motherboard in response to either an over-voltage or under-voltage condition.

7. A device for preventing the flow of power from an internal power supply of an electronic apparatus to multiple internal electronic components of said apparatus, where said internal power supply has one or more output terminals, and where each of said multiple electronic components has an input terminal, said device comprising:

a plurality of circuit breaking means;

each of said circuit breaking means having an input terminal and an output terminal;

each of the input terminals of said plurality of circuit breaking means connected to any of said one or more output terminals of said internal power supply of said electronic apparatus;

each of the output terminals of said plurality of circuit breaking means connected to a different one of said input terminals of said multiple electronic components; and an enclosure housing said plurality of circuit-breaking means.

8. The device according to claim 7 wherein said connections between the output terminals of the internal power supply and the input terminals of the circuit breaking means are each independent one from the other.

9. A device for preventing the flow of power from an internal power supply of an electronic apparatus to multiple internal electronic components of said apparatus, where said internal power supply has one or more output terminals, and where each of said multiple electronic components has an input terminal, said device comprising:

a plurality of circuit breaking means;

each of said circuit breaking means having only one input terminal and a plurality of output terminals;

each of the input terminals of said plurality circuit breaking means connected to any of said one or more output terminals of said internal power supply of said electronic apparatus;

each of the output terminals of said plurality of circuit breaking means connected to a different one of said input terminals of said multiple electronic components; and an enclosure housing said plurality of circuit-breaking means.

10. A device for managing the flow of power from an internal power supply of a computer to one or more electronic components inside said computer, said internal power supply having one or more output terminals and said one or more electronic components having each an input terminal, the device comprising:

one or more circuit breaking means corresponding to the number of said one or more electronic components;

said one or more circuit breaking means having each an input terminal and an output terminal;

each of the input terminals of said one or more circuit breaking means connected to any of said one or more output terminals of said internal power supply; and each of the output terminals of said one or more circuit breaking means connected to a different input terminal of said one or more electronic components.

11. A device for preventing the flow of power from an internal power supply of a computer to multiple internal electronic components of said computer, where said internal power supply has one or more output terminals, and where each of said multiple electronic components has an input terminal, said device comprising:

a plurality of circuit breaking means;

each of said circuit breaking means having an input terminal and an output terminal;

each of the input terminals of said plurality of circuit breaking means connected to any of said one or more output terminals of said internal power supply;

each of the output terminals of said plurality of circuit breaking means connected to a different one of said input terminals of said multiple electronic components; and an enclosure housing said plurality of circuit breaking means.

12. A computer comprising:

a housing;

an internal power supply having one or more output terminals;

one or more internal electronic components each having an input terminal;

one or more circuit breaking means for protection of said one or more electronic components;

said one or more circuit breaking means each having an input terminal and an output terminal, wherein the input terminal of each said circuit breaking means is connected to any one of said one or more output terminals of said internal power supply, and the output terminal of each said circuit breaking means is connected to the input terminal of one or more of said electronic components.

13. A device contained within a computer housing, wherein said computer housing houses a computer, said device for preventing the flow of power from an internal power supply of the computer to at least one internal electronic component of the computer, wherein said device attaches at a point between said internal power supply and said electronic component, and wherein said internal power supply has at least one output terminal and said electronic component has at least one input terminal, said device comprising:

circuit breaking means having an input terminal connected to an output terminal of the internal power supply, and at least one output terminal corresponding to and connected to an input terminal of said internal electronic component of the computer.

14. The device of claim 13 wherein said device is attached inside said housing to multiple electronic components located inside the computer housing.

15. The device of claim 14 wherein said device is attached independently inside said housing to each of said electronic components inside said housing.

16. The device of claim 13 wherein the circuit breaking means only activates when power supplied by said power supply is outside acceptable operating range for said electronic component.

17. The device of claim 13 further comprising a housing.

18. The device of claim 13 wherein said circuit breaking means is configured to prevent the flow of power from the internal power supply of the computer to the internal electronic component of the computer when the power from the power supply is greater or lesser than a safe operating range for said internal electronic component.

19. A method for protecting at least one computer device located inside a computer housing from power surge caused by the computer's internal power supply located inside said computer housing, wherein said device is electrically connected to said power supply, said method comprising inserting in said electrical connection, between said power supply and said device, a power protector which is triggered to stop or alter the flow of power to said device when the power from said power supply is not within an acceptable operating range for said device.

20. The method of claim 19 wherein a separate device protector is provided for each device inside said computer housing to be protected.

21. The method of claim 19 wherein a single device protector is associated with multiple devices inside said computer housing to be protected.

22. The method of claim 19 wherein said device protector comprises a circuit breaker.

23. The method of claim 19 wherein said device protector comprises a fuse.

24. The method of claim 23 wherein said device protector also comprises a diode.

25. The method of claim 19 wherein said device protector comprises a diode.

26. Inside a computer housing providing a housing for an internal power supply and one or more computer components comprising a computer connected to or controlled by said internal power supply, an apparatus for protecting at least one said computer component, located inside said computer housing and connected to or controlled by said internal power supply also located inside said computer housing, from the flow of power from said internal power supply, wherein the apparatus is capable of being inserted between and connected to said internal power supply and to said computer component, and whereas said apparatus comprises a power protector that will when connected of to said internal power supply and to said computer component, upon activation, stop or alter the flow of current from said internal power supply to said computer component.

27. The apparatus of claim 26 wherein said power protector will become activated when power supplied by said power supply is not within an acceptable operating range for said computer component.

* * * * *